United States Patent
Marshall

(10) Patent No.: US 6,961,853 B2
(45) Date of Patent: Nov. 1, 2005

(54) DIGITAL WATERMARKS

(75) Inventor: Alan D. Marshall, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 09/780,370

(22) Filed: Feb. 12, 2001

(65) Prior Publication Data
US 2001/0025341 A1 Sep. 27, 2001

(30) Foreign Application Priority Data

Mar. 22, 2000 (EP) .............................................. 00302314

(51) Int. Cl.⁷ .............................. H04L 9/00; G06F 17/60
(52) U.S. Cl. ........................ 713/176; 705/75; 705/57; 380/201
(58) Field of Search ..................... 713/176; 382/232; 283/113; 705/75; 380/201

(56) References Cited

U.S. PATENT DOCUMENTS

| 5,530,759 A | | 6/1996 | Braudaway et al. .......... 380/54 |
| 5,559,884 A | * | 9/1996 | Davidson et al. ........... 713/187 |
| 5,646,997 A | * | 7/1997 | Barton ........................ 713/176 |
| 5,664,018 A | * | 9/1997 | Leighton ..................... 380/54 |
| 5,673,316 A | * | 9/1997 | Auerbach et al. ............. 705/51 |
| 5,898,779 A | | 4/1999 | Squilla et al. ................ 380/23 |
| 5,949,885 A | | 9/1999 | Leighton ..................... 380/54 |
| 6,069,914 A | * | 5/2000 | Cox ............................. 375/150 |
| 6,285,774 B1 | * | 9/2001 | Schumann et al. ......... 382/100 |

FOREIGN PATENT DOCUMENTS

| EP | 0840513 | 5/1998 | ............ H04N/7/24 |
| EP | 0860997 | 8/1998 | .......... H04N/5/913 |
| EP | 0 953 938 A2 | 11/1999 | |
| EP | 1018833 | 7/2000 | |
| WO | WO 98/37513 | 8/1998 | .......... G06K/19/08 |
| WO | 99/17537 | 4/1999 | |
| WO | WO 99/41900 | 8/1999 | ............ H04N/1/32 |

* cited by examiner

Primary Examiner—Andrew Caldwell
Assistant Examiner—Michael Pyzocha

(57) ABSTRACT

A method of and an apparatus for implementing real-time transaction specific watermarking to generate a transaction specific digitally watermarked data file is described. The method comprises two stages. Prior to receiving (52; 102) a transaction request for the data file: the data file is divided (34; 84) into a plurality of sections; and a set of pre-calculated elementary watermarks is created (86). On receiving (52; 102) a transaction request for the supply of the data file: the method comprises calculating (56; 106) a transaction specific watermark; selecting (64; 114) pre-calculated elementary watermarks equivalent to constituent portions of the transaction specific watermark by comparing the constituent portions of the transaction specific watermark with the pre-calculated units of data; and constructing (66; 116, 118) a transaction specific watermarked data file by assembling the selected pre-calculated elementary watermarks together with corresponding ones of the plurality of sections.

14 Claims, 5 Drawing Sheets

DIGITAL WATERMARKS

TECHNICAL FIELD

The present invention concerns improvements relating to digital watermarks and more specifically to methods and apparatus for applying transaction-specific digital watermarks to data files, such as files containing digitised media, in real time with the aim of detecting unauthorised use and copying.

BACKGROUND ART

Recent advances in digital and communications technology have enabled the relatively easy distribution of Audio-Visual (AV) works, such as images, audio tracks and movies, in the form of digital data. The Internet is frequently used to distribute digital copies of such works and this in itself poses a serious problem in terms of maintaining copyright protection. As a result of this, techniques of electronic watermarking have received a great deal of attention as a way of detecting and combating illicit use of these AV works. Typically, these techniques involve embedding a digital watermark identifying the copyright owner, the provider, the user and/or even the permitted uses of the work, into the AV data in such a way as to make the watermark undetectable by the user. If the data is used in an unauthorised manner or by an unauthorised person, then by comparison of the watermark data with the known user data, this illicit use can be detected.

There are many different methods of generating digital watermarks which involve various time/frequency domain transformations, encryption techniques and other data manipulation techniques (see for example EP-A-0 953 938 and WO-A-99/17537). However, when transaction specific information is to be included in the watermark, these existing methods involve creating the digitally watermarked version of the AV work on demand. In practice, this process involves some form of data computation on the whole or most of the media file representing the AV work. The time taken to create such watermarked AV work is proportional to the size of the media file of the AV work and, due to the continual trend towards increasing file sizes, the creation time is also getting longer. This problem makes the above existing watermarking techniques unsuitable for transaction specific watermarking of AV works in real-time which can also cause difficulties with highly desirable facility of accessing AV works via the Internet.

The issues associated with real-time watermarking have been described fully in co-pending European Patent Application No. 99309133.9, which addresses the problem of applying watermarking in real-time to the digital data to be distributed.

Co-pending European Patent Application No. 99309133.9 describes a solution in which a transaction-specific watermark is applied to a subset of the complete media file, allowing a sample of the file to be obtained without the transaction-specific watermark having to be applied to the complete file. This is done in away that ensures that if multiple samples are obtained, their watermarks combine to provide a useable watermark on the collection of samples. However, this method still requires the watermarking to be applied in real-time to those parts of the complete file that are being transferred to a customer. The method succeeds in reducing the computation time required to provide samples of the media file for evaluation, but still does not address the problem of watermarking the complete file in real time when/if the final purchase is made.

Applying a digital watermark to a complete media data file requires substantial computation, and it is difficult to do this at realistic cost or at a speed that will not delay real-time interaction by electronic trading for example.

Accordingly it is desired to overcome or substantially reduce the above mentioned problems. More specifically, it is desired to provide a method of digitally watermarking a complete media file in real time to minimise the delay during a customer interaction for example.

SUMMARY OF THE INVENTION

The present invention resides in the appreciation by the inventor that the computation required at the time of customer interaction, and thereby any delay, can be minimised by precomputing possible portions of a watermarked AV work and then only selecting a combination of these portions to create a transaction specific watermarked AV work in real time.

According to one aspect of the present invention, there is provided a method of applying a digital watermark to a data file, the method comprising: creating a pre-calculated set of elementary watermarks and a plurality of sections of the data file; calculating a data file watermark on receipt of a request for supply of the data file; selecting pre-calculated elementary watermarks equivalent to constituent portions of the data file watermark by comparing the constituent portions of the data file watermark with the pre-calculated elementary watermarks; and constructing a watermarked data file by assembling selected elementary watermarks combined with the plurality of sections of the data file.

The present invention can be considered to be a novel synergistic combination of two known data processing techniques, namely: watermarking and speculative execution. The latter of these involves precomputation of solutions to multiple alternative problems, so that the required solution is available with minimum delay once the particular problem to be solved has been identified.

One advantage of the present invention is that it allows a transaction-specific watermark to be applied to a media/AV file or portion of a media/AV file, with only small amounts of processing required after the watermark data has been determined. These characteristics are appropriate for watermarking digital media data before electronic distribution to non-trusted customers. The penalty is that multiple versions of at least some sections of the media/AV file need to be stored, which adds additional storage costs. However, these additional costs can be limited by computing alternative versions of only some sections of the media/AV file, and by careful choice of storage format.

The calculating step may comprise retrieving user data from a user database to construct the transaction specific watermark containing customer information and permitted uses of the data file for example. In this way, the information that needs to be included in the watermark can be obtained by the simplest of user requests. This also advantageously reduces the time taken in creating a transaction specific watermark.

Preferably, the method further comprises selecting sections of the data file most suitable for the addition of the elementary watermarks. This advantageously provides an additional layer of security as the sections of the image having the most important information to an image, for example, can be watermarked and are less likely to be cropped or otherwise illegally tampered with.

Preferably, the elementary watermarks are binary representations. By providing the elementary watermarks as a simple data constructions, the present invention can be implemented with optimally minimised storage requirements. Furthermore, as the digital watermark consists at its most basic level of binary codes, it will always be possible to breakdown a data file watermark into its constituent elementary watermarks.

The constructing step may advantageously comprise incorporating error correction data into the data file watermark. This is helpful in combating distortion of data files during transmission for example by random noise. Furthermore, error correction codes are particularly useful in the reconstruction a watermark for analysis when the elementary watermarks incorporated in the data file are of a minimal size and more prone to corruption.

One way of applying the watermark to the data file is for the creating step to comprise: creating multiple copies of each section of the plurality of sections of the data file; applying to each set of multiple copies a set of elementary watermarks such that each copy of a section contains a different elementary watermark; and storing the elementary watermark containing copies of each section.

In this case, the constructing step may comprise accumulating a selected plurality of elementary watermark containing copies of the sections. More specifically, each part of the data file watermark is considered in turn. The current part of the data file watermark corresponds to the watermark data embedded in one of the pre-computed versions of the current section of the media file. That pre-computed version of the current section is chosen, and merged with the similarly chosen version of the other sections of the media file to form the watermarked media file.

In many watermarking algorithms, the watermark is represented as a set of small changes to the values of the individual data elements (e.g. pixels) in the original file. It is often computationally expensive to compute the set of small changes, but computationally cheap to combine the set of changes with the original data values (e.g. by a simple addition per pixel). In such a case it may be better to compute multiple versions of the set of changes for different values of watermark data, but to leave the final combination of the set of changes with the original file to the real-time assembly step. This technique reduces the cost of storing the alternative watermarked versions of the media file sections, because each set of small changes generally needs fewer bits per pixel than a completely separate file section. Accordingly, an alternative way of applying the watermark is for the creating step to comprise: calculating and storing the set of elementary watermarks; and calculating and separately storing the plurality of sections of data. Also, the constructing step preferably comprises: selecting each section of data and adding to it a pre-calculated elementary watermark selected by virtue of its correspondence with a constituent part of the data file watermark.

According to another aspect of the present invention there is provided a method of implementing real-time transaction specific watermarking to generate a transaction specific digitally watermarked data file, the method comprising: prior to receiving a transaction request for the data file: dividing the data file into a plurality of sections; and creating a set of pre-calculated elementary watermarks; and on receiving a transaction request for the supply of the data file: calculating a transaction specific watermark; selecting pre-calculated elementary watermarks equivalent to constituent portions of the transaction specific watermark by comparing the constituent portions of the transaction specific watermark with the pre-calculated units of data; and constructing a transaction specific watermarked data file by assembling the selected pre-calculated elementary watermarks together with corresponding ones of the plurality of sections.

The present invention also extends to a data carrier comprising a computer program arranged to configure a computer to implement a method as described above.

According to another aspect of the present invention there is provided an apparatus for applying a digital watermark to a data file, the apparatus comprising: means for creating a pre-calculated set of elementary watermarks and a plurality of sections of the data file; means for calculating a data file watermark on receipt of a request for supply of the data file; means for selecting pre-calculated elementary watermarks equivalent to constituent portions of the data file watermark by comparing the constituent portions of the data file watermark with the pre-calculated elementary watermarks; and means for constructing a watermarked data file by assembling selected elementary watermarks combined with the plurality of sections of the data file.

BRIEF DESCRIPTION OF THE DRAWINGS

Methods and apparatus according to preferred embodiments of the present invention for implementing real-time transaction specific watermarking will now be described by way of example, with reference to the accompanying drawings in which.

DETAILED DESCRIPTION OF PREFERRED EMBODIMENTS OF THE PRESENT INVENTION

Figure 1:
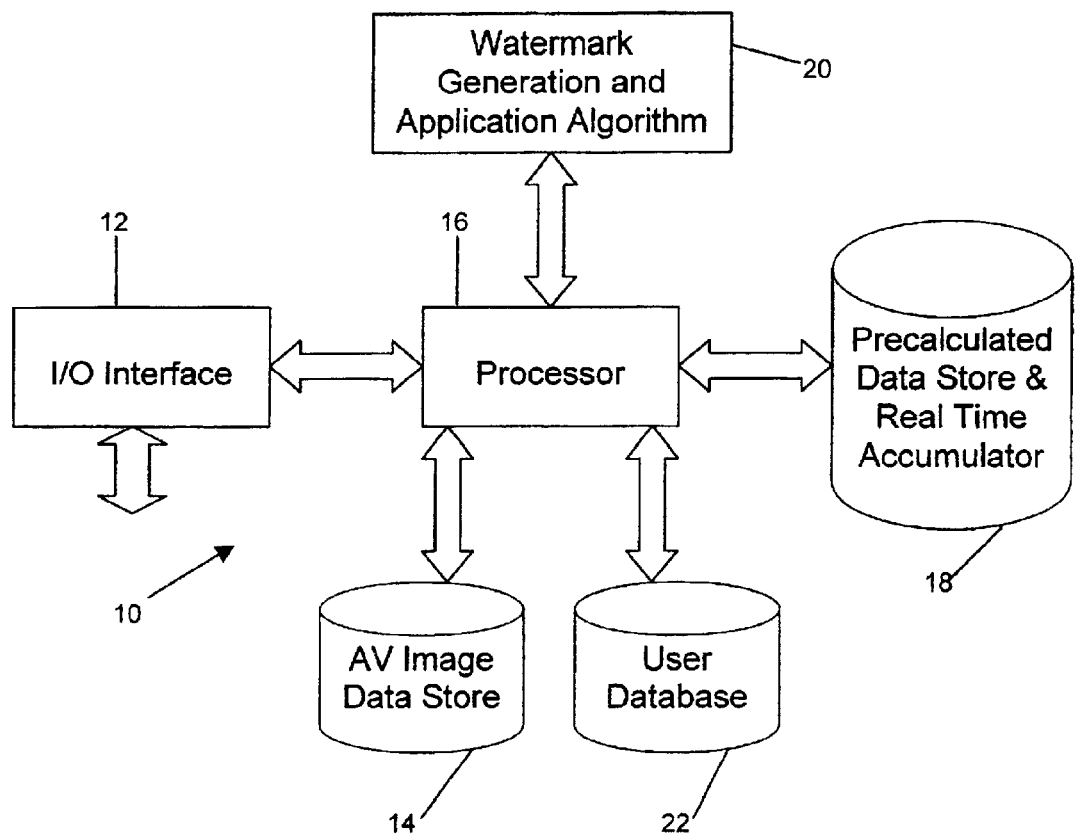
FIG. 1 is a schematic block diagram showing an apparatus for use in implementing embodiments of the present invention.

Referring to FIG. 1 there is shown an apparatus 10 for implementing methods of real-time watermarking according to embodiments of the present invention. The term real-time watermarking as used in throughout the present description and claims is intended to refer to the generation of a transaction specific watermarked AV work on demand and without any appreciable delay.

The apparatus 10 comprises an I/O (input/output) interface 12 which allows users access to and selection of images stored locally as media files in an image store 14. The I/O interface 12 is arranged to co-operate with a GUI (Graphical User Interface) coupled to the apparatus 10 directly or via a communications network, such as the Internet (not shown). In the latter case, the I/O interface 12 may be configured to communicate with an Internet Browser (not shown) to provide users with selected graphical images (media files) from the image store 14 and also to interpret the browser commands into information requests.

The I/O interface 12 is connected to a processor 16 to which the interpreted commands are sent and from which watermarked image data is received. The processor 16 carries out the task of image extraction and watermarked data assembly as will be described in detail later. Also, in a non real-time processing step, the processor 16 is arranged to divide each media file into sections and to calculate partially watermarked image data for each of the sections as will be described in detail later. This partially watermarked image data is stored in a pre-calculated data store 18 that also acts as a real-time accumulator 18.

The processor 16 is controlled by a software algorithm 20 that is used to generate a real-time transaction specific watermark and effectively to apply the watermark to the selected image data. The transaction specific watermark is generated in real-time and on demand and relies on information stored in a user database 22. The user database 22 simply stores relevant information regarding each (registered) user such that this information can be used to create a watermark that can specify the user and also the permitted uses of the supplied image by that user. Typically, the permitted uses are specified by reference in the watermark to a code representing a particular set of permitted uses.

A first embodiment of the present invention is now described with reference to FIGS. 2 and 3. The method comprises two stages each of which is described below.

The present embodiment comprises separating the application of a transaction-specific watermark to a whole or part of a digitised media file into two distinct steps: a preprocessing stage and a real-time watermark assembly stage. Each of these stages is now described.

Figure 2:
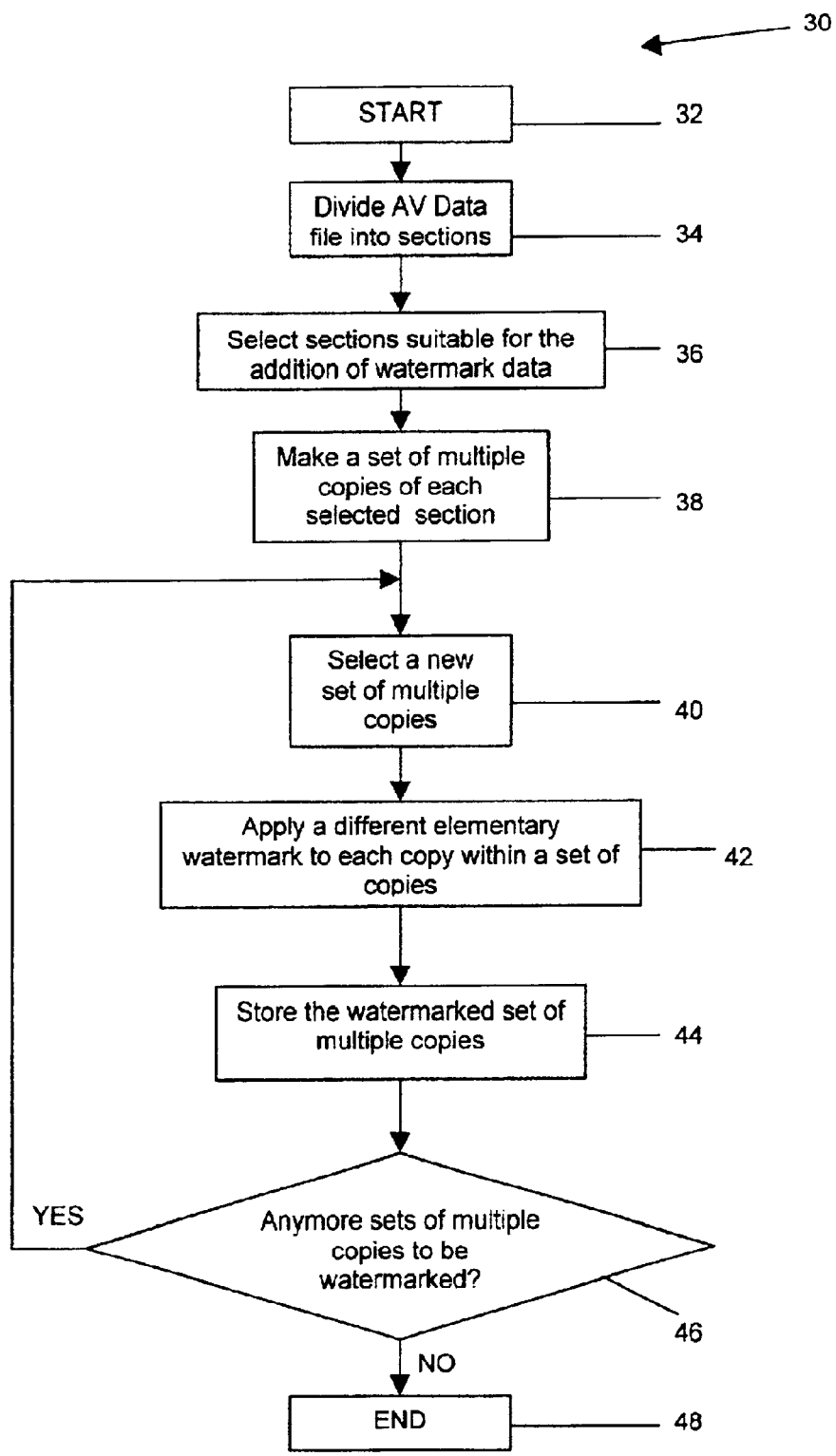
FIG. 2 is a flow diagram showing the steps involved in creating pre-calculated data according to a first embodiment of the present invention.
Figure 3:
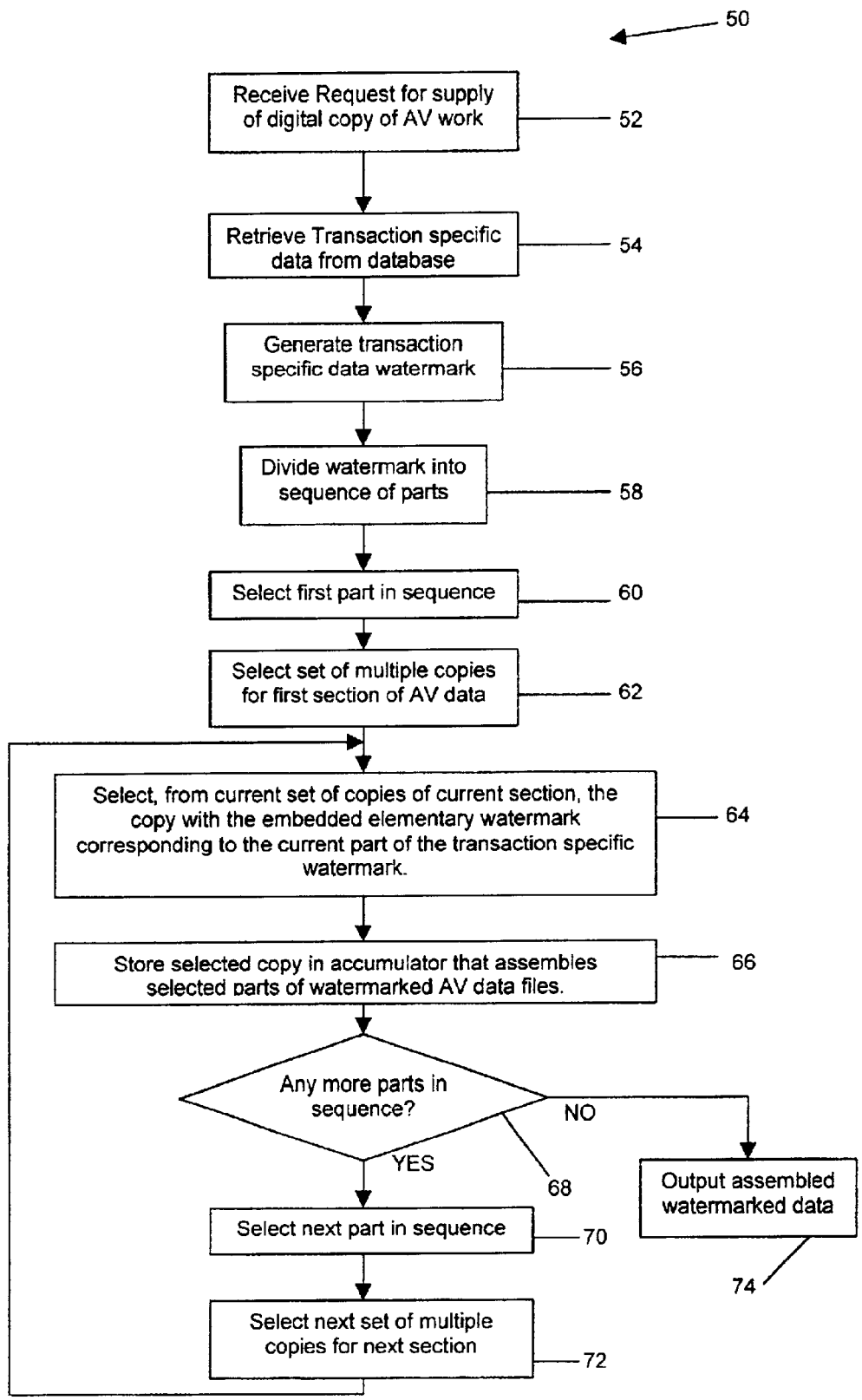
FIG. 3 is a flow diagram showing the steps involved in using the pre-calculated data of FIG. 2 in applying a watermark to image data according to the first embodiment of the present invention.

The preprocessing stage 30 of the first embodiment, shown in FIG. 2, starts at 32 typically with the addition of a new media file into the AV data store 18. The new media file is divided at 34 into sections, each of which is large enough to carry imperceptibly at least one bit of watermark data. The size of each section needs to be relatively large in comparison to the watermark data that is to be carried in the section so as to ensure that the image is not distorted noticeably by the additional watermark data. Typically, the media file is in the order of 1 Mb in size, each section is 64 bytes (8×8 pixels) and the watermark data is 100 bytes with one bit being provided per section.

From the divided sections, those sections are then selected at 36 that are suitable for the addition of watermark data. This selection procedure can be one of many different possible known watermarking schemes, see for example that described in WO-A-98/37513. In the known schemes, sections on the periphery of the image are often omitted from selection because of the ability to crop these sections to remove easily watermark data from the images. Other schemes select only the main parts of the image on the basis that these are less likely to be tampered with as they are more likely to be noticed. In addition, the uniformity of a section can also be considered as the more uniform a section, the harder it is to hide the watermark data unnoticeably within the section.

For each selected section, a set of multiple copies is made at 38. In the present embodiment, only two copies are made per selected section, as there are only two different types of elementary watermark data. However, in alternative embodiments where the number of different types of elementary watermark data is N and N is greater than two, the number of copies made per section is also equivalent to N.

Once all the sets of multiple copies have been made, one set of copies is selected at 40. For this selected set, a different elementary watermark is applied at 42 to each copy within the set. In the present embodiment, one of the two copies has an elementary watermark corresponding to a '0' added, and the other copy has an elementary watermark corresponding to a '1' added. The elementary data being embedded at this stage is not a complete watermark, but bit sequences that will be selected and assembled into a watermark at the real-time assembly stage, described later. The elementary watermarked copies are stored at 44 in the pre-calculated data store 18.

If there are any more sets remaining at 46, then the procedure from the selection of a new set of multiple copies at 40 is repeated. If there are no further sets to be watermarked in this way at 46, then the preprocessing stage 30 ends at 48. At this point in the method, it is not known what elementary watermark data will be embedded into the media file.

The real-time watermark assembly stage 50 (FIG. 3) is initiated by the apparatus 10 receiving a request for supply of a digital copy of an AV work at 52. The request identifies the user and hence details regarding the user are retrieved at 54 from the customer database 22. If the request is from a new user, then the information in the request itself is used for the generation of the watermark. The retrieved or supplied customer data is then used to generate at 56 a transaction specific data watermark which encodes information related to the particular transaction, such as the identity of the customer and the usage rights transferred in the transaction. The decoding keys for the encoded data are stored in the user database 22 and can be used to decode the information in a watermarked image as will be described later.

There are many different known schemes, which the skilled addressee will be aware of, that can be used for generating a transaction specific watermark. Some of the more powerful schemes involve the use of Fourier transforms or other data transformation techniques. Most of these schemes can be used in the present embodiment, because the operation of present invention is independent from that of most of these schemes. There are a few requirements of the watermarking algorithm being used which are described in detail later. However generated, the transaction specific watermark is used as an input to the rest of the real-time assembly stage 50 set out below.

The transaction specific watermark is divided at 58 into a sequence of parts (e.g. bits), each of a size that can be carried as embedded watermark data by one of the sections of the media file. The watermark is then processed part-by-part in a defined sequence. Each part is to be carried in a section of the media file chosen by following a pre-defined sequence.

The construction of the watermarked media file commences with the selection at 60 of the first part of the divided watermark in the predefined sequence. Then the set of multiple copies of image data for the first section of the divided media file is selected at 62. Next, the processor 16 selects at 64, by means of comparison, the specific pre-computed copy of the image data in the current section that contains an embedded elementary watermark corresponding to the current part of the transactions specific watermark. The selected copy including the embedded elementary watermark is stored at 66 in the real-time accumulator 18 such that it is merged with any data already existing in the accumulator 18 (initially none).

A check is then carried out at 68 to determine whether the pre-determined sequence contains any further parts of the transaction specific watermark. If any further part remains, then the next part in the sequence is selected at 70 and the set of multiple copies of image data for the next section of the media file is also selected at 72. Then steps 64 to 68 are repeated, namely the process of selecting the predetermined watermarked data copy which corresponds to the current part of the transaction specific watermark, storing and merging the result and checking to see if any further parts need to be processed.

If there are no further parts of the transaction specific watermark to be processed at 68, then the contents of the accumulator 18 are output at 74 as the watermarked media file. This watermarked media file is thus made up of a combination of different pre-computed sections of image data each containing a partial watermark (elementary watermark) such that the desired watermark for the media file is constructed from the constituent pre-calculated partial (elementary) watermarks. The only processing required in real-time by the apparatus 10 is the selection and merging of appropriate pre-watermarked sections, which can be performed rapidly.

Whilst any known watermarking technique/algorithm can be used with the above described technique of applying a transaction specific watermark in real-time to a media file, there are several requirements that the watermarking technique has to meet to be useable with present embodiment. It is important for the watermarking of separate sections of the media file to be independent operations. In some forms of watermarking, these operations are chained, so that the processing of one block (section) depends in some way on the results of the processing of previous blocks. These watermarking techniques generally involve passing a substantial amount of data between sections, and therefore would require large numbers of pre-computed partial (elementary) watermarks for each section, making them unsuitable for real-time application.

It is also important to appreciate that the watermarking algorithm should preferably include a means of allowing the detector to lock onto the original placement, alignment and scaling of the embedded watermark data to allow for efficient detection even if the media has been cropped, scaled or rotated. Several watermarking algorithms, that use Fourier transforms or other powerful data processing techniques to enable robust coding of watermarks, are particularly suitable for the present embodiments. This is a useful feature of watermarking algorithms in general and provides benefits when used with the present invention.

Figure 4:
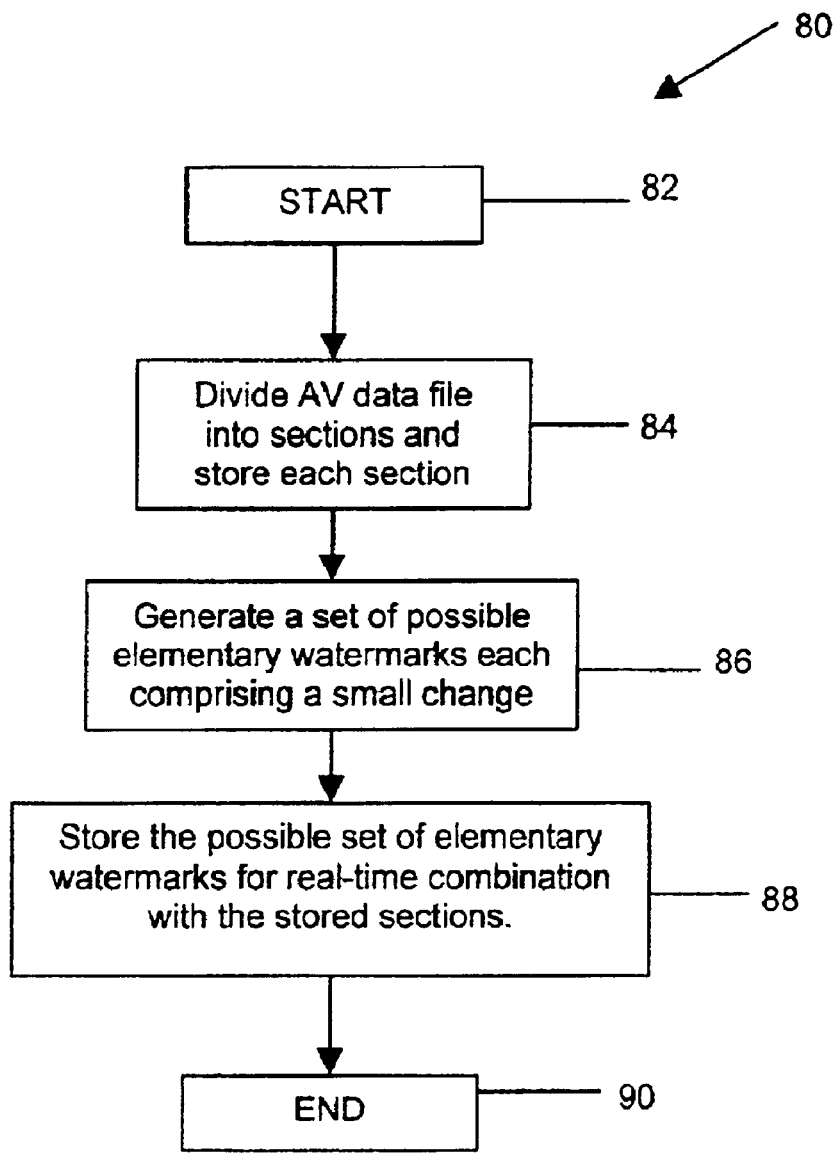
FIG. 4 is a flow diagram showing the steps involved in creating pre-calculated data according to a second embodiment of the present invention.
Figure 5:
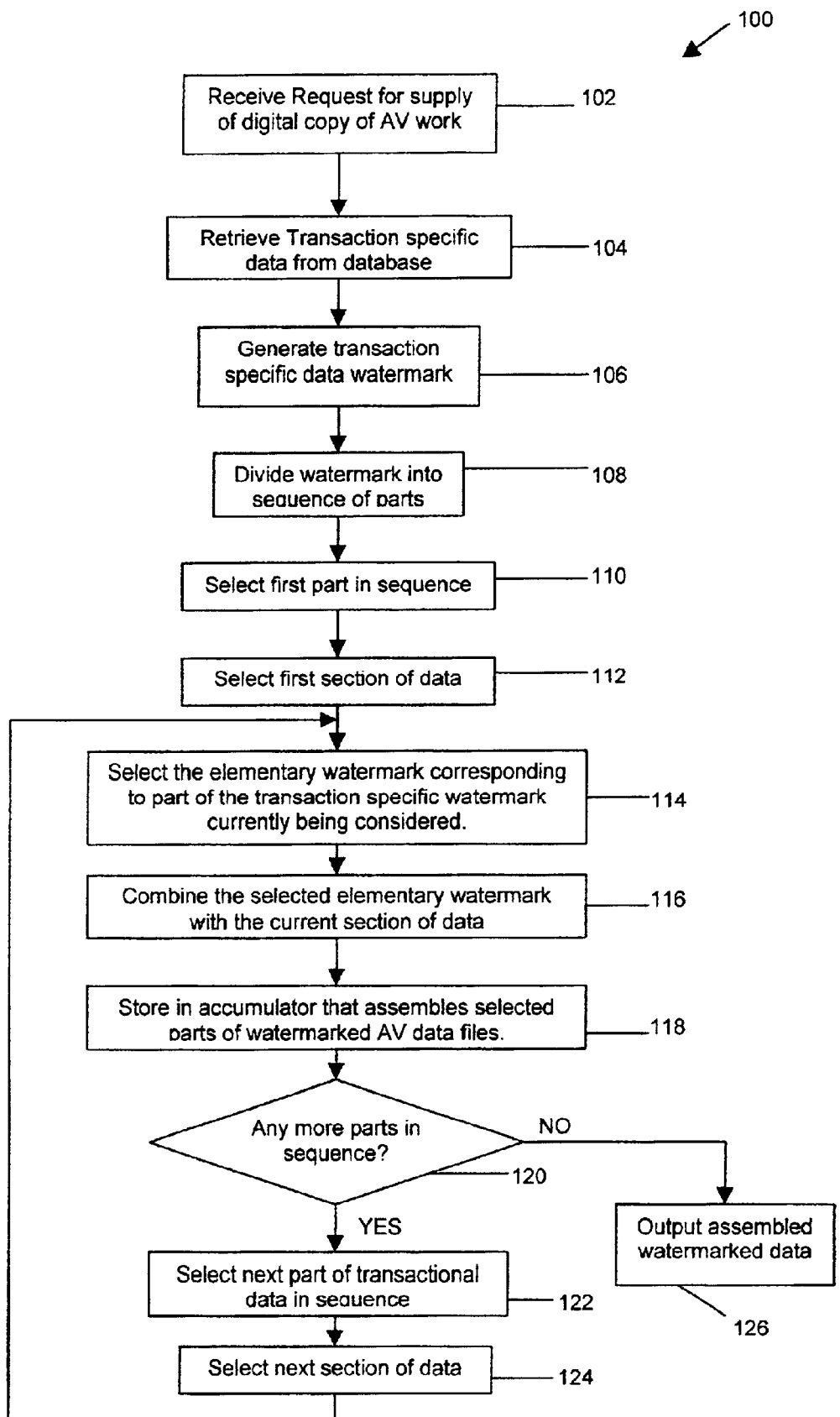
FIG. 5 is a flow diagram showing the steps involved in using the pre-calculated data of FIG. 4 in applying a watermark to image data according to the second embodiment of the present invention.

Referring now to FIGS. 4 and 5, a second preferred embodiment of the present invention is now described. Generally, the second embodiment is similar in many ways to the first embodiment. However, there is a major difference in the storage of multiple copies of the image data. In the second embodiment, the elementary watermarks are not embedded within multiple copies of a section. Rather they are stored separately until real-time selection of the appropriate elementary watermark occurs. The predetermined elementary watermark is combined with the image data in a selected section of the media file in real-time. Even thought this takes slightly longer at run-time than the first embodiment, the difference is minimal compared to the savings in data storage which are provided by the second embodiment.

The second embodiment comprises two stages: a preprocessing stage and a real-time watermark assembly stage. Each of these stages is now described.

FIG. 4 shows the preprocessing stage 80, which is simpler than that of the first embodiment. The preprocessing stage 80 starts at 82 when a new media file is to be stored in the apparatus 10. The media file is divided at 84 into sections and stored in the pre-calculated data store 18. Alternatively, the sections of the media file could also be stored in the AV image store 14 because the raw image data is only partitioned and not changed in any other way at this stage. The size of the sections into which the media file is divided depends on the specific watermark generation algorithm 20 being used. In the present embodiment, the size is a matrix of 8 by 8 pixels per section.

A set of possible elementary watermarks is then generated at 86. Each watermark preferably comprises a set of small changes to the values of the individual data elements (pixels) in a section of the media file. As in the first embodiment, two different types of changes are stored, the changes representing '0' and '1' conditions. However, the number of different types of elementary watermark can be greater than in the first embodiment because of the limited amount of space required for storage of the set of changes.

The calculated set of possible elementary watermarks is then stored at 88 in the pre-calculated data store 18 for use in the second stage of the present embodiment namely, the real-time watermark assembly stage. The preprocessing stage ends at 90 when all the possible elementary watermarks have been stored.

The real-time watermark assembly stage 100 is now described with reference to FIG. 5. The real-time watermark assembly stage 100 commences with the receipt of a request for supply of a digital copy of an AV work at 102 by the apparatus 10. Details regarding the user are retrieved at 104 from the customer database 22 in response to the request. The retrieved customer data is then used to generate at 106a transaction specific watermark that encodes information related to the particular transaction, such as the identity of the customer and the usage rights transferred in the transaction.

The transaction specific watermark is divided at 108 into a sequence of parts (e.g. bits); each of a size that can be carried as embedded watermark data (an elementary watermark) by one of the sections of the media file. In this embodiment, the watermark is divided into its constituent binary bits and each part represents a single binary bit. The transaction specific watermark is then processed part-by-part in a defined sequence. Each part is to be carried in a section of the media file chosen by following a pre-defined sequence.

The watermarked media file construction commences with the selection at 110 of the first part (bit) of the divided watermark in the predefined sequence and the selection at 112 of the set of multiple copies of image data for the first section of the divided media file. Next, the processor 16 selects at 114 the specific elementary watermark stored in the pre-calculated data store 18, which corresponds to the current part of the transactions specific watermark. The selected elementary watermark is combined at 116 with the current section of data by a simple procedure of addition per pixel to form a section of image data with an embedded elementary watermark. This section, including the embedded watermark data, is stored at 118 in the real-time accumulator 18 such that it is merged with any data already existing in the accumulator 18 (initially none).

The real-time watermark assembly stage 100 then continues with a check at 120 to determine whether the predetermined sequence contains any further parts of the transaction specific watermark. If any further part remains, then the following is repeated until no further parts remain: The next part in the sequence is selected at 122 and the next section of the media file is also selected at 124. Then the steps of selecting the elementary watermark at 114, combining it with the current section of data at 116, merging the result with other accumulated data copy at 118 and checking to see if any further parts need to be processed at 120, are also repeated. When the check at 120 determines that there are no further parts in the sequence, then the contents of the accumulator 18 are output at 126 as the watermarked media file.

As is clear from the above, the various elementary watermarks which make up the desired transaction specific watermarks are stored separately from the original file data. Accordingly, the chosen elementary watermark for each file section needs to be merged with the corresponding original file section at the real-time processing stage. This is not computationally expensive and so is also a rapid operation.

In the first and second embodiments as described, the complete watermarked file is accumulated before output. Both embodiments may be modified so that this is not necessarily the case—for example, parts may be processed in such a sequence that they can be output as generated without an accumulation step.

Once an image file has been watermarked in by either the first or the second embodiments, it can be transmitted to the user. The correct use of the watermarked data can be determined by the issuing authority periodically sampling images in use and determining whether they are being used by the registered user or for the purpose they were intended. This is easily achieved by simply taking an image and extracting its watermark, decoding the watermark to determine the registered user for this work and the registered uses. If the registered use or registered user do not correspond to the actual use or user then this can indicate illegal copying, use or distribution of the authorised AV image data file.

The watermark extraction procedure is effectively the opposite of the watermark application procedure and so is not described herein. However, the extraction procedure may involve use of some error correction techniques as a first step to correct errors in the watermark data caused by noise for example. These techniques are well known and are not described herein. The skilled addressee will also appreciate that the procedure for decoding the watermark is carried out as the opposite of the encoding procedure and as this depends on the particular watermarking algorithm 20 being used, no further explanation is provided herein. The decoded watermark provides access to all the necessary user information stored in the user database 22.

Having described particular preferred embodiments of the present invention, it is to be appreciated that the embodiments in question are exemplary only and that variations and modifications such as will occur to those possessed of the appropriate knowledge and skills may be made without departure from the scope of the invention as set forth in the appended claims. For example, the present invention is not restricted to image files and is also operable on audio or any other media/AV data files. Any type of independent section watermarking technique could be used with the present invention and also any appropriate error correction coding scheme.

What is claimed is:

1. A method of applying a digital watermark to a data file, the method comprising:

creating a pre-calculated set of elementary watermarks and a plurality of sections of the data file by creating multiple copies of each section of the plurality of sections of the data file;

applying to each set of multiple copies a set of elementary watermarks such that each copy of a section contains a different elementary watermark; and storing the elementary watermark containing copies of each section;

calculating a data file watermark on receipt of a request for supply of the data file;

selecting pre-calculated elementary watermarks equivalent to constituent portions of the data file watermark by comparing the constituent portions of the data file watermark with the pre-calculated elementary watermarks; and constructing a watermarked data file by assembling selected elementary watermarks combined with the plurality of sections of the data file.

2. A method according to claim 1, wherein calculating the data file watermark comprises calculating a transaction specific watermark.

3. A method according to claim 2, wherein calculating the data file watermark comprises retrieving user data from a user database to construct the transaction specific watermark.

4. A method according to claim 1, wherein the elementary watermarks are binary representations.

5. A method according to claim 1, wherein constructing the data file watermark comprises incorporating error correction data into the data file watermark.

6. A method according to claim 1, wherein constructing the data file watermark comprises accumulating a selected plurality of elementary watermark containing copies of the sections.

7. A method according to claim 1, wherein creating the pre-calculated set of elementary watermarks and a plurality of sections of the data file comprises:

calculating and storing the set of elementary watermarks; and calculating and separately storing the plurality of sections of data.

8. A method according to claim 7, wherein constructing the data file watermark comprises selecting each section of data and adding to it a pre-calculated elementary watermark selected by virtue of its correspondence with a constituent part of the data file watermark.

9. A method according to claim 1, further comprising selecting sections of the data file most suitable for the addition of the elementary watermarks.

10. A method of implementing real-time transaction specific watermarking to generate a transaction specific digitally watermarked data file, the method comprising:

prior to receiving a transaction request for the data file:
dividing the data file into a plurality of sections;
creating a set of pre-calculated elementary watermarks;
creating multiple copies of each section of the plurality of sections of the data file;
applying to each set of multiple copies the set of elementary watermarks such that each copy of a section contains a different elementary watermark; and
storing the copies of the sections containing the elementary watermarks;

on receiving a transaction request for the supply of the data file:
calculating a transaction specific watermark;
selecting pre-calculated elementary watermarks equivalent to constituent portions of the transaction specific watermark by comparing the constituent portions of the transaction specific watermark with the pre-calculated units of data; and constructing a transaction specific watermarked data file by assembling the selected pre-calculated elementary watermarks together with corresponding ones of the plurality of sections.

11. A method according to claim 10, wherein creating the pre-calculated elementary watermarks comprises:

calculating and storing the set of elementary watermarks; and separately storing the plurality of sections of data.

12. A method according to claim 11, wherein constructing the transaction specific watermarked data file comprises:

selecting each section of data and adding to it a pre-calculated elementary watermark selected by virtue of its correspondence with a constituent part of the data file watermark.

13. An apparatus for applying a digital watermark to a data file, the apparatus comprising a processor adapted:

to create a pre-calculated set of elementary watermarks and a plurality of sections of the data file by creating multiple copies of each section of the plurality of sections of the data file;

applying to each set of multiple copies a set of elementary watermarks such that each copy of a section contains a different elementary watermark; and storing the elementary watermark containing copies of each section;

to calculate a data file watermark on receipt of a request for supply of the data file;

to select pre-calculated elementary watermarks equivalent to constituent portions of the data file watermark by comparing the constituent portions of the data file watermark with the pre-calculated elementary watermarks; and to construct a watermarked data file by assembling selected elementary watermarks combined with the plurality of sections of the data file.

14. A method of applying a transaction-specific digital watermark having N different elements to a data file, comprising:

dividing the data file into a plurality of sections, each section suitable to have an element of the watermark applied to it;

generating a set of N copies of each section of the data file;

applying to each copy of each set of copies a different one of the respective N elements;

generating, upon receipt of a request for a data file, the transaction-specific watermark; and aggregating copies from the different sets of copies to create a data file to which the transaction-specific watermark has been applied.

* * * * *